(12) United States Patent
Hüther

(10) Patent No.: US 7,965,173 B2
(45) Date of Patent: Jun. 21, 2011

(54) METHOD SYSTEM FOR SIMPLIFIED IDENTIFICATION OF AN OBJECT USING A TRANSPONDER

(76) Inventor: Sven Hüther, Essen (DE)

( * ) Notice: Subject to any disclaimer, the term of this patent is extended or adjusted under 35 U.S.C. 154(b) by 416 days.

(21) Appl. No.: 12/192,246

(22) Filed: Aug. 15, 2008

(65) Prior Publication Data

US 2010/0039268 A1 Feb. 18, 2010

(51) Int. Cl.
*H04Q 5/22* (2006.01)
(52) U.S. Cl. .................. 340/10.5; 340/573.1; 340/572.1; 340/505
(58) Field of Classification Search ............... 340/572.1, 340/5.2, 573.1, 10.5, 10.1, 505; 235/375–385
See application file for complete search history.

(56) References Cited

U.S. PATENT DOCUMENTS

| | | | |
|---|---|---|---|
| 6,209,104 B1 * | 3/2001 | Jalili | 726/18 |
| 6,323,771 B1 * | 11/2001 | Payne et al. | 340/573.1 |
| 7,081,819 B2 * | 7/2006 | Martinez de Velasco Cortina et al. | 340/572.7 |
| 2004/0066273 A1 * | 4/2004 | Cortina et al. | 340/5.1 |
| 2005/0088302 A1 * | 4/2005 | Pucci et al. | 340/568.1 |
| 2008/0094206 A1 * | 4/2008 | Martinez de Velasco Cortina et al. | 340/539.11 |

* cited by examiner

*Primary Examiner* — Travis R Hunnings
(74) *Attorney, Agent, or Firm* — Rankin, Hill & Clark LLP

(57) ABSTRACT

The invention relates to a method of providing a transponder for marking an object, the transponder having a storage means for storing a unique, preferably worldwide unique, number with a predetermined number n of digits, the method comprising the steps of:
  providing a set of worldwide unique numbers that are available for marking;
  defining a section of n consecutive digits from the n digits for information storage, m being smaller than or equal to n;
  providing a number which represents information that is intuitively human recognizable and usable and associated with the object, the number having not more than m digits;
  checking whether the provided number is contained within the section of m consecutive digits in the worldwide unique numbers of the set of available worldwide unique numbers;
  if the provided number is contained in one or more worldwide unique numbers, selecting the serial number or respectively one worldwide unique number of the more worldwide unique numbers;
  providing a transponder with the selected worldwide unique number, and
  removing the selected worldwide unique number from the set of available serial numbers.

The invention further relates to a method of identifying an object, and to a system for marking an object.

6 Claims, 4 Drawing Sheets

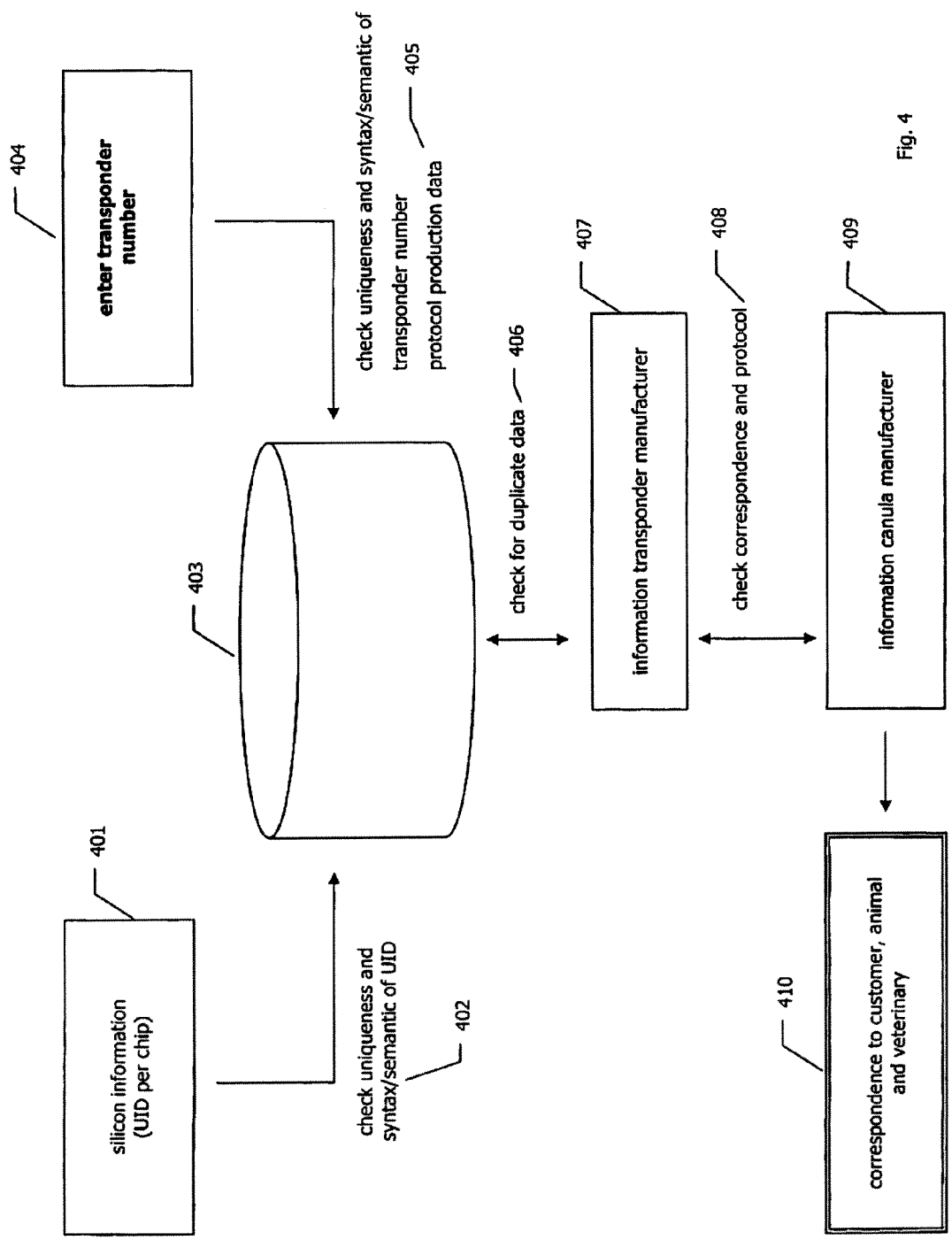

METHOD SYSTEM FOR SIMPLIFIED IDENTIFICATION OF AN OBJECT USING A TRANSPONDER

FIELD OF THE INVENTION

The present invention relates generally to the field of transponder technology for providing information about an object and more particularly to methods and systems for simplified identification of an object.

BACKGROUND

Transponders are generally small sized data carriers with a memory means that is accessible by electromagnetic fields created by an access device, and thus without any physical contact between the access device and the transponder. Additionally, such transponders usually operate without a battery as they extract their operating energy from the energy of the electromagnetic fields.

Due to their small size and their unlimited lifetime, such transponders or tags are most suitable for carrying information regarding an object directly on or in the object.

For example, a transponder may be embedded in a spectacle frame and programmed with information relating to the spectacle, e.g. owner, optician, contact details, details of the lenses, and so on. In this case, specific information about the object is stored in the memory means of the transponder. This requires that the memory means is large enough to store the required amount of data, and also that any access device for reading, processing and/or storing the data can handle the data structure in order to extract the information from the raw data. The latter requirement implies a data structure standard of some sort, which in turn implies a lack of flexibility in changing the data structure if e.g. a further information becomes important and needs to be stored.

An alternative to storing information about an object in the memory means of the transponder is to store information in a data base system at a database provider, e.g. an optician's organization, and to relate this information to a particular pair of spectacles by means of a, preferably worldwide, unique number stored in the transponder.

Such a worldwide unique number is used for animal tagging, and health regulations in some countries require that domestic animals like cats and dogs be tagged with a transponder that contains a worldwide unique number. The main advantage is that only the data structure for the worldwide unique number requires a standard, while the type of information stored about the object and the data structure relating to this information may differ from country to country or database provider to database provider.

Even though such a worldwide unique number will be readable with standard technical equipment and offers the flexibility to store different and updated information about the object in a database, access to the database is required in order to obtain any information at all related to the object. If such access is not available, e.g. because the object is in a different country or the person reading the worldwide unique number has no rights to access the data base or there is a technical defect in the database access system, then the Information regarding the object can not be retrieved. The same applies if there is no database entry relating to the object, e.g. because it has not been registered. The transponder then fails to serve its purpose.

Accordingly, there is a need for improved methods, systems and transponders that allow to extract usable information relating to an object from a transponder without the need to access databases or to analyze data structures.

SUMMARY OF THE INVENTION

The invention provides a method of providing a transponder for marking an object, the transponder having a storage means for storing a, preferably worldwide, unique number with a predetermined number n of digits, the method comprising the steps of:

providing a set of worldwide unique numbers that are available for marking;

defining a section of m consecutive digits from the n digits for information storage, m being smaller than or equal to n;

providing a number which represents information that is intuitively human recognizable and usable and associated with the object, the number having not more than m digits;

checking whether the provided number is contained within the section of m consecutive digits in the worldwide unique numbers of the set of available worldwide unique numbers;

if the provided number is contained in the section of m consecutive digits in one or more worldwide unique numbers, selecting this one worldwide unique number or respectively one worldwide unique number of these more worldwide unique numbers;

providing a transponder with the selected worldwide unique number, and removing the selected worldwide unique number from the set of available worldwide unique numbers.

Accordingly, the transponder's worldwide unique number itself transports human recognizable information. Information about the object is thus available even if no database entry exists, e.g. because the object is not registered or has not yet been registered in a database. In fact, a database is no longer the only data source, although it may be used in advantageous embodiments to provide additional information.

The information can be identified and used without access to databases or knowledge of any data structure according to the inventive method of identifying an object, comprising the steps of reading the worldwide unique number of a transponder associated with an object;

intuitively identifying a section of the worldwide unique number as an information associated with the object;

using the information.

For example, the transponder's worldwide unique number may comprise a telephone number of the owner of the object. Then anybody capable to read out the transponder's worldwide unique number can contact the owner without need to access any database and even if the object is not registered in any database at all. Lost objects like domestic animals may therefor be returned to their owner, even if the finder does not have the technical or contractual means to access any database that contains contact details, or if the animal has no record in any database.

The invention further provides a system for marking an object with a transponder, comprising a storage means for a range of preferably worldwide unique transponder serial numbers a predetermined amount n of digits;

an interface system for read access to the storage means, for checking whether a worldwide unique number is available;

a transponder providing means for providing a transponder with an available worldwide unique number, said worldwide unique number comprising a number representing information that is intuitively human recognizable and usable and associated with the object; and a database means for holding information related to the transponder.

Further embodiments of the invention are defined in the following description, figures and claims.

BRIEF DESCRIPTION OF THE DRAWINGS

FIG. 4 illustrates various data dependencies.

DETAILED DESCRIPTION OF PREFERRED EMBODIMENTS OF THE INVENTION

Figure 1:
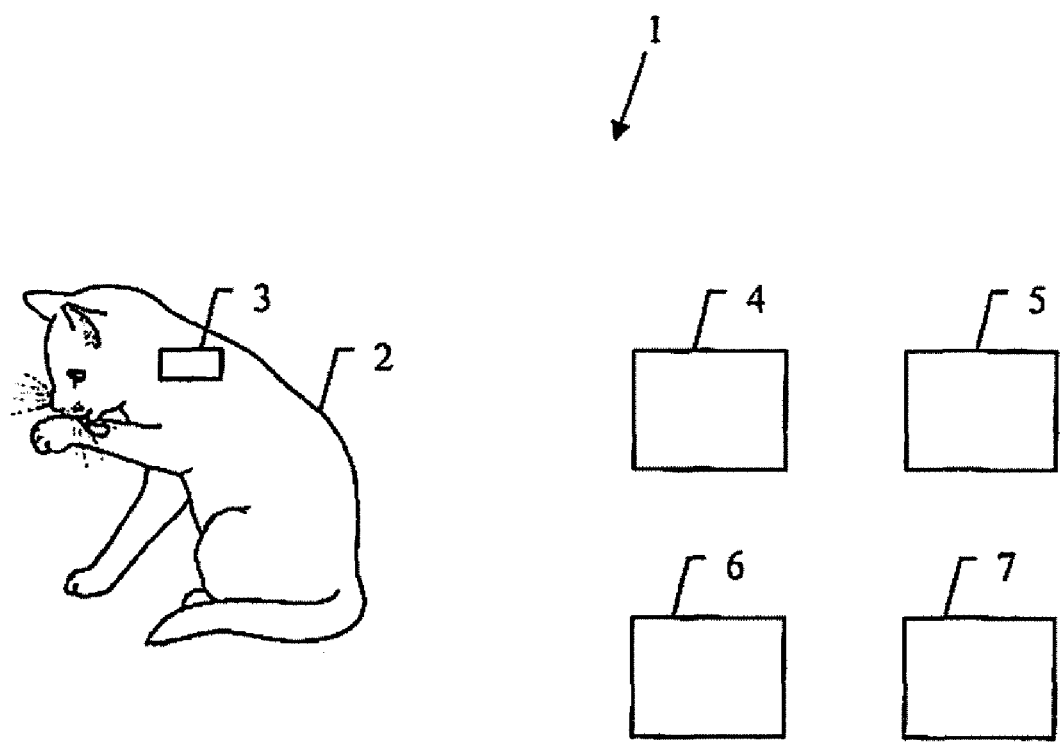
FIG. 1 illustrates a system for tagging an object with a transponder.

Referring now to the figures, several embodiments or implementations of the present invention are hereinafter described in conjunction with the drawings, wherein like reference numerals are used to refer to like elements throughout and wherein the illustrated structures are not necessarily drawn to scale. The following embodiments illustrate the inventive concept A. System FIG. 1 illustrates an exemplary system 1 for tagging an object 2, here a cat, with a transponder 3 in accordance with various aspects of the invention.

The system 1 comprises a storage means 4 for administration of a set of available unique, and preferably worldwide unique, numbers, an interface system 5 for read and/or write access to the storage means 4, a transponder providing means 6 for providing a transponder 3 with a desired worldwide unique number, and optionally a database means 7 for holding information related to the transponder 3.

The transponder 3 can be of any known type.

An example for a suitable transponder 3 is an RFID (radio frequency identification) tag. Such an RFID tag is a small item which comprises an antenna coil as well as memory means, both e.g. realized on a printed circuit board (PCB) or with direct bonded or similar suitable technology, and embedded in a housing. The antenna coil may be designed to operate at a specific frequency, e.g. a radio frequency of 13.56 MHz, or any other suitable frequency like e.g. 125 kHz, 134.2 kHz, 868 to 928 MHz or 2.54 GHz or others. The housing may be entirely closed and preferably does not offer any contacts or openings as the operating access to the memory means is via electromagnetic fields, and as the tag preferably uses the voltage induced by the electromagnetic fields to generate its operating voltage without a battery or the like.

The memory means can be an ASIC which preferably has one time programmable (OTP) memory cells for storing information like a worldwide unique number. The OTP memory cells can be programmable electronically, by direct physical contact to the PCB or other technology, as the case may be, prior to embedding the PCB in the housing, and their contents is not alterable thereafter. It is therefore possible to program a worldwide unique number into the OTP memory cells that will not be user alterable once the tag has been produced. Of course, other memory means may be used as well. For example, OTP memory cells may be used which are laser-programmed rather than electrically programmed, or ROM circuits, Flash-ROM circuits or RAM circuits may be used, or combinations thereof, as long as they offer sufficient storage space, preferably a minimum of 64 bits, for storing the worldwide unique number and prohibiting arbitrary change of the worldwide unique number after programming.

The unique number itself may be a locally unique, preferably a globally unique, more preferably a worldwide unique number from a given range of such numbers. For animal tagging, international standard ISO 11784 defines a particular structure and range for worldwide unique numbers. According to ISO 11784, such a worldwide unique number comprises fifteen decimal digits, which are encoded in bits in a specific manner also defined by ISO 11784. The first three digits are used for a national or manufacturer's code. While the subsequent twelve decimal digits are an arbitrary number In ISO 11784, they are a particular unique reference number according to the invention, as explained in detail below. This information in form of a worldwide unique number, comprised of three decimal digits for a manufacturer/country code and twelve decimal digits for a unique reference number, is stored in the storage means of the tag, preferably in the OTP memory cells.—The storage means may of course comprise additional information in other embodiments, e.g. more than fifteen and/or other digits. Also, the unique reference number may have more or fewer than twelve digits.

ISO 11785 contains other technical specifications for tags in animal applications like frequency, modulation etc. The invention is, of course, not restricted to the context of ISO 11784/85 which is used herein for illustrative purposes only. Any application with any data structure and any technical specification is suitable as long as there is a variety of unique, and preferably worldwide unique, numbers available. Also, the invention is obviously applicable to applications other than animal tagging, in particular to all objects including small carryable items like spectacles, watches, mobile phones etc., large mobile items like cars, motorcycles, number plates etc. and stationary items like buildings, street lamp posts etc. A manufacturer's or country code is not necessary either in other applications, i.e. the worldwide unique number may be the unique reference number.

A record of available worldwide unique numbers is stored in storage means 4, e.g. a general purpose computer or a dedicated database server. The procedure will be demonstrated exemplarily on the test code 999. The term "stored" relates in this text to any kind of administration, including a list of all available worldwide unique numbers; a list comprising a lower limit, an upper limit, and those numbers that are no longer available, or the like. In the example application of animal tagging, this could be a variety of worldwide unique numbers, and in particular a range of worldwide unique numbers that a service provider has reserved for himself. For example, the range could be from 999XXXXXXXXXXXX to 999YYYYYYYYYYYY, with XXXXXXXXXXXX and YYYYYYYYYYYY being an arbitrary twelve digital digit number, e.g. from 999100000000000 to 999274877906944. Other ranges or individual unique numbers could be provided in addition.

The interface system 5 is used to provide access to the storage means 4. The interface system 5 can be a program executed on the computer or server that constitutes the storage means 4, or can be executed on a different computer or can be an internet access portal or the like. Its purpose is to provide at least read access to the storage means 4 in order to identify available worldwide unique numbers and to establish whether a particular worldwide unique number is still available.

The optional database means 7 may relate information like an address etc. to one or more all worldwide unique numbers and/or unique reference numbers.

B. Method

The above described system is preferably used as follows.

A service provider, e.g. the applicant, is provided with a range of unique numbers. Ideally, this range is worldwide unique and not available to other service providers. This range is administered in the storage means 4 in any known and suitable way, e.g. in a dedicated database server.

For the tagging of an object, a number which represents information that is intuitively human recognizable and usable and associated with the object is provided. Such a number could be a telephone number, e.g. of the owner of the domestic animal, possibly with national and area code, e.g. 012024561414. Other intuitively human recognizable numbers can be used instead, e.g. birth dates like 01012000 corresponding to Jan. 1, 2000.

If the provided number is a twelve digit number in the ISO 11784 example case, then this number is used as the unique reference number. Three leading digits are added according to the manufacturer/country, e.g. 999, to define a worldwide unique number with fifteen digits, here 999012024561414.

Availability of the worldwide unique number that contains the unique reference number is then checked.

This can be done by means of the interface system 5, e.g. online via an internet access. If the range of twelve decimal digit unique reference numbers available for the provider, here the exemplary provider 999, is e.g. from 000000000000 to 274877906944 (discarding the leading three digits 999 which are not selectable arbitrary for animal tagging according to ISO 11784), then the worldwide unique number 999012024561414 comprising the twelve digit intuitively human recognizable unique number 012024561414 would be available.

If the intuitively human recognizable number contains less than the twelve digits required for the unique reference number, e.g. the eight digits of the above birth date 01012000, it can be checked whether it is available with added digits at the beginning or the end to fill up the twelve digits.

This is illustrated in an example short number like XXXXXXXXXX with ten digits, although it is clear that this intuitively human recognizable number may be comprised of any number of digits. In the ten digits example, availability could be identified for the unique reference numbers YZXXXXXXXXXX, YXXXXXXXXXXZ, and XXXXXXXXXXYZ, where Y, Z are any decimal number from 0 to 9, within the given lower and upper (here: 000000000000 respectively 274877906944) limit of the given range. A suitable number should then be selected as the unique reference number. Preferably, the added digits, here Y, Z, are 0, but may be any other number.

The worldwide unique number is then determined by the leading three digits, e.g. 999, and the unique twelve digit reference number.

Thereafter, a transponder with the selected available worldwide unique number needs to be provided, e.g. one time programmed or selected from a pre-programmed number of transponders. The unique reference number has to be blocked for any duplicate use in the storage means 4, e.g. by marking or deletion, and a database entry with information relating to the object 2 can optionally be created in the database means 7. This can be done in any suitable way.

Obviously, in applications other than ISO 11784, the unique reference number and/or the worldwide unique number may have more ore fewer than twelve respectively fifteen decimal digits, or be encoded differently.

C. Preferred Implementation of the Method

In a preferred embodiment, the invention provides a workflow that ensures tracking of the transponder 3 from production to use in or on the object 2, and avoids duplicate use of a worldwide unique number. The workflow is as follows for the example of domestic animal tagging according to ISO 11784.

A customer, sales agent or doctor calls up the software of the service provider.

Figure 2:
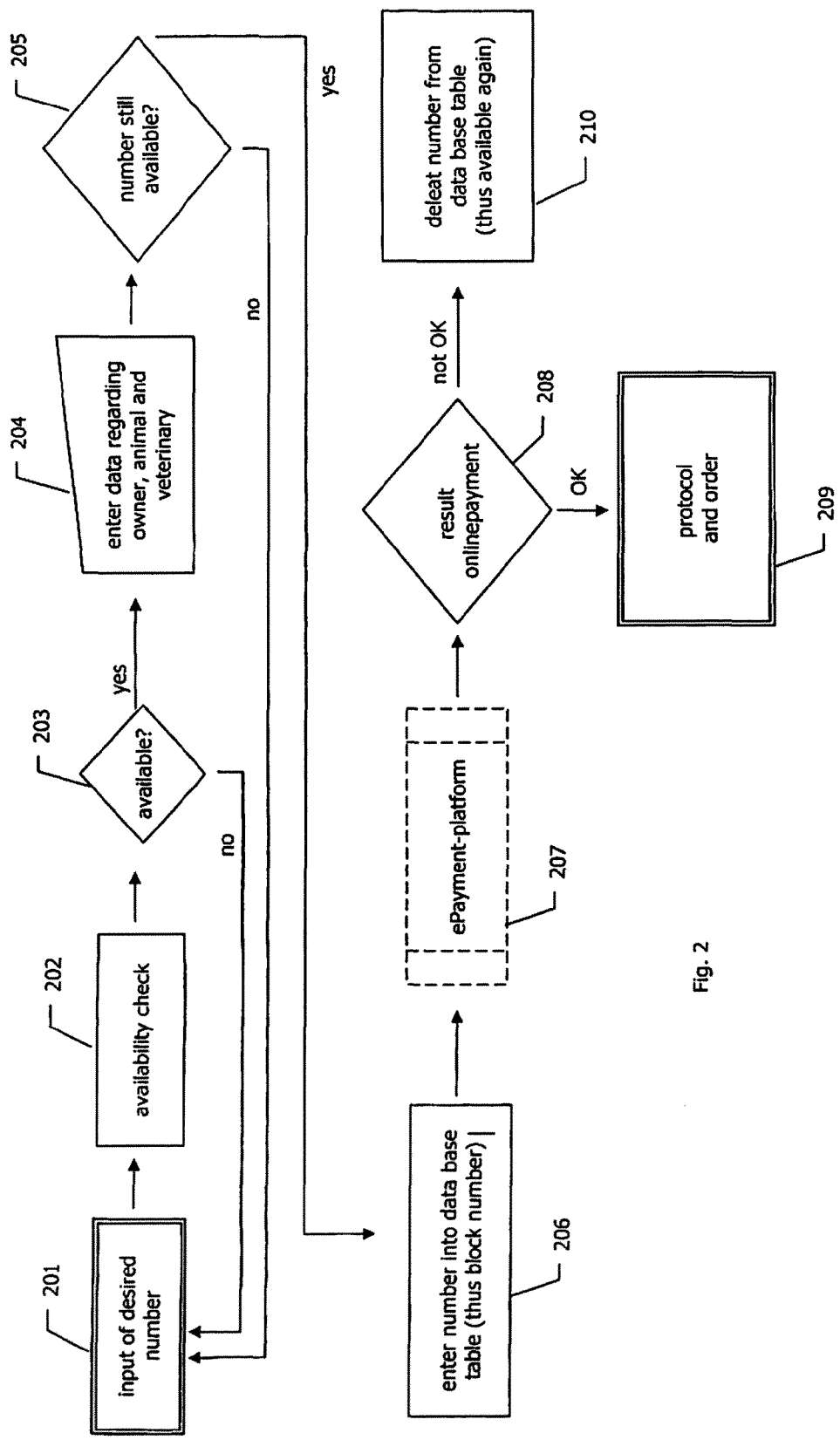
FIG. 2 is a flow diagram of an order process.

In a first step 201, see FIG. 2, the customer enters a desired intuitively human recognizable number like a telephone number. Availability is then checked in the storage means 4 in step 202. This availability check will identify any available worldwide unique number that contains the desired number regardless of leading or ending digits, and it comprises a selection if more than one suitable worldwide unique number is available. If there is no availability, the process returns to step 201.

Otherwise the process may continue with entering data about owner, animal and/or veterinary in step 204.

Thereafter, the availability is checked again in step 205 immediately before blocking the worldwide unique number in step 206. Blocking can be accomplished by adding the number to a list of used numbers, or removing the number from a list of available numbers, or marking the number as used, or any other suitable way.

Payment is then effected by the customer, step 207, and if the payment is completed without error, the procedure is protocolled and an order for a transponder with the worldwide unique number is generated in step 209. If an error occurs during payment, the blocked worldwide unique number is unblocked in step 210 and the procedure is terminated.

Figure 3:
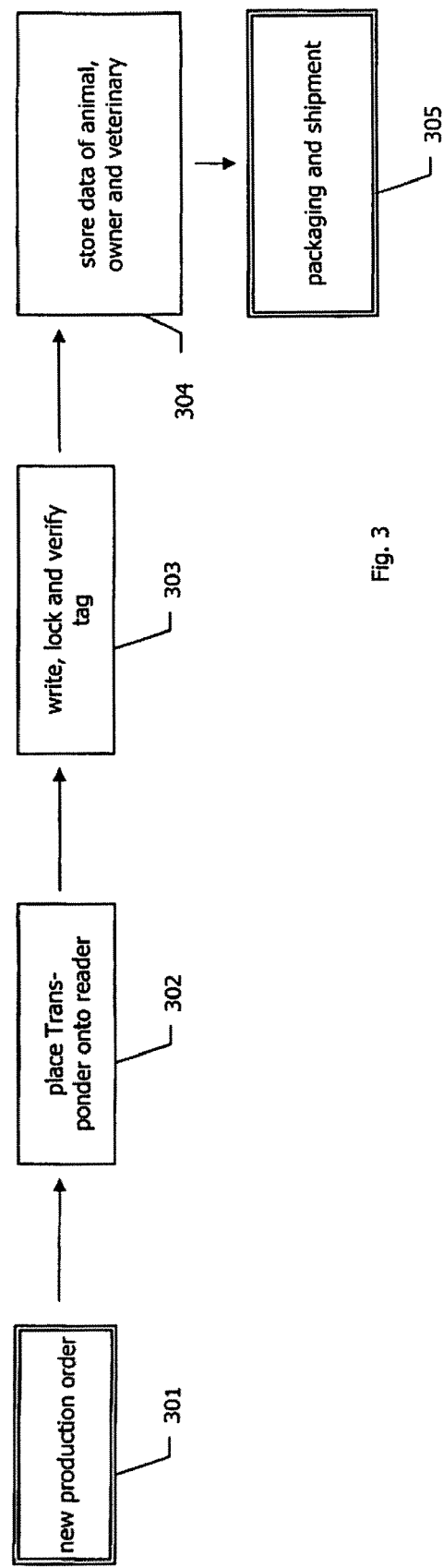
FIG. 3 is a flow diagram of a production process.

The automated production is illustrated in FIG. 3.

A new order from step 209 arrives, step 301, and a transponder is prepared for production in step 302 by placing a transponder onto a reader. Thereafter, the transponder is programmed, locked so that the programming can not be altered any more, and the programming is verified in step 303.

Data regarding animal, owner and/or veterinary can then be stored in database means 7 in step 304, and the transponder may be packaged and shipped, step 305.

In a preferred embodiment the procedure should preferably ensure data integrity and exclude duplicate use of worldwide unique numbers, unique reference numbers and/or UIDs, e.g. by means of the data dependency structure shown in FIG. 4.

Regarding the transponder's UID or 'serial number', 401, it must be insured, 402, that it is contained in the database 403 once only.

Likewise, the worldwide unique number provided according to the invention, 404, must be unique and duplicate use must be excluded, 405.

UID and worldwide unique number are related in database 403. Several checks against existing data, 406, and in particular silicon data, are performed including information from the transponder manufacturer, 407. The production/sterilisation data including production charge are protocolled, 408, taking into account information from the manufacturer of the canula of the transponder, 409.

Finally, there must be an association to the customer, and in the specific exemplary animal tagging application also to animal and/or doctor, 410. Other associations may be stored instead and/or in addition according to the requirements of the application.

Ideally, the following data is protocolled for each transponder for the exemplary animal tagging application: UID with production date and site of the transponder; sterilisation date, charge, type and site; customer and address; animal data; data of doctor implanting the transponder; order of customer with payment details; worldwide unique transponder number with production site and date.

In a preferred embodiment, the method ensures that the information contained in the steps 1 to 5 of the following table 1 will be available.

TABLE 1

| Step | What | Comments |
|------|------|----------|
| 1 | Production Wafer | A wafer is a silicon wafer which represents the base plate from which the transponder chips are produced. This means that one wafer contains X transponder chips. |
| 2 | Production Transponder | e.g. a tissue compatible glass envelope with an antenna coil and a chip |
| 3 | Insertion of Transponder into cannula | One cannula contains the transponder |
| 4 | Sterilisation of the transponders in the cannula | In the blister pack by means of a ethylene oxide sterilisation |
| 5 | Delivery of the transponder in the cannula | To the veterinary surgeon, wholesaler, breeder . . . |

The invention claimed is:

1. A method of providing a transponder for marking an object, the transponder having a storage means for storing a unique, preferably worldwide unique, number with a predetermined number n of digits, the method comprising the steps of:
    providing a set of worldwide unique numbers that are available for marking;
    defining a section of m consecutive digits from the n digits for information storage, m being smaller than or equal to n;
    providing a number which represents information that is intuitively human recognizable and usable and associated with the object, the number having not more than m digits; checking whether the provided number is contained within the section of m consecutive digits in the worldwide unique numbers of the set of available worldwide unique numbers;
    if the provided number is contained in the section of m consecutive digits in one or more worldwide unique numbers, selecting this one worldwide unique number or respectively one worldwide unique number of these more worldwide unique numbers;
    providing a transponder with the selected worldwide unique number; and
    removing the selected worldwide unique number from the set of available worldwide unique numbers.

2. The method as defined in claim 1, wherein the step of providing a number comprises providing a telephone number.

3. The method as defined in claim 1, wherein the step of providing a number comprises providing a date of birth.

4. The method as defined in claim 1, wherein the step of checking comprises checking whether the amount of digits of the number is smaller than the amount m of digits of the section, and if this is affirmative, identifying as available all worldwide unique numbers that comprise the number regardless of additional leading or ending digits, and selecting one worldwide unique number thereof.

5. The method as defined in claim 1, further including the steps of reading the worldwide unique number from the transponder on the object, intuitively identifying a section of the worldwide unique number as information associated with the object, and using the information.

6. The method as defined in claim 1, wherein the transponder includes a storage means for administration of at least one of the set of worldwide unique transponder numbers and the consecutive digits, an interface system for read access to the storage means for checking whether the worldwide unique number is available, a transponder providing means for providing the transponder with an available worldwide unique number, and a database means for holding information related to the transponder.

\* \* \* \* \*